Patented Dec. 7, 1926.

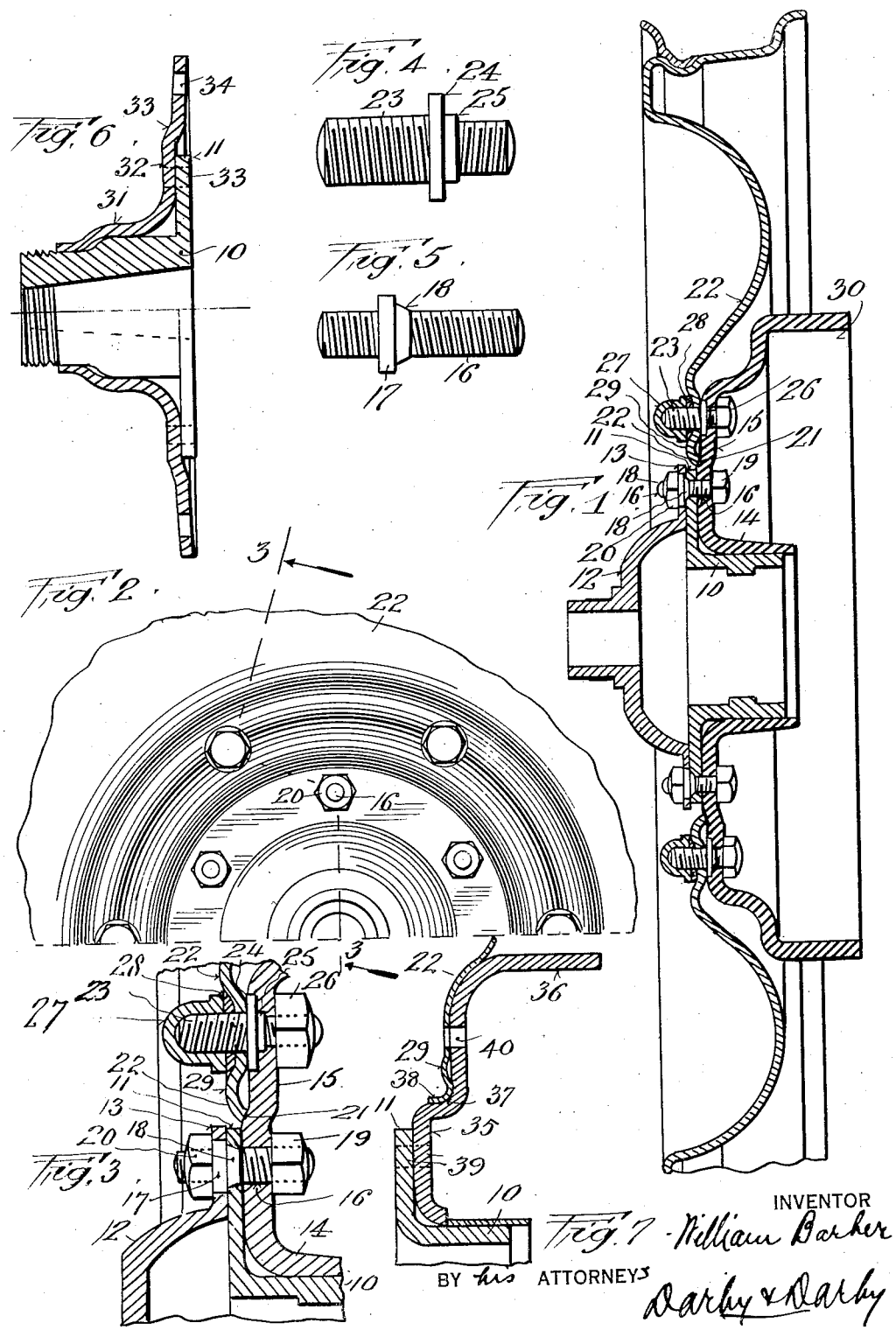

1,609,854

UNITED STATES PATENT OFFICE.

WILLIAM BARBER, OF BROOKLYN, NEW YORK.

DEMOUNTABLE METAL DISK WHEEL.

Application filed April 1, 1922. Serial No. 548,594.

This invention relates to automobile metal disk wheels.

The object of the invention is to provide means whereby a metal disk wheel may be mounted or demounted from a hub of any of the standard forms without deranging the axle.

A further object is to provide a demountable metal disk wheel structure in which the axle may be mounted or removed and inserted or replaced without disturbing the wheel structure.

A further object of the invention is to provide a metal disk wheel structure in which the disk is supported wholly upon and clamped to the hub flange which in turn is applied to and secured upon the wheel hub.

Other objects of the invention will appear more fully hereinafter.

The invention consists substantially in the construction, combination, location and relative arrangement of parts, all as will be more fully hereinafter set forth as shown in the accompanying drawings and finally pointed out in the appended claims.

Referring to the accompanying drawing:

Figure 1 is a view in vertical central section of a demountable metal disk wheel structure embodying the principles of my invention.

Fig. 2 is a broken or fragmentary view in face elevation of the hub portion of a demountable disk wheel structure embodying the invention.

Fig. 3 is a broken view in section on the line 3—3, Fig. 2 looking in the direction of the arrows.

Figs. 4 and 5 are detail views of stud bolts employed in securing the metal disk to the flange hub member and in securing the flanged hub member to the hub flange.

Fig. 6 is a detail view in section showing a flanged hub sleeve member applied to a hub structure and adapted to receive a metal disk wheel.

Fig. 7 is a view, similar to Fig. 6, showing a modified arrangement embraced within the spirit and scope of my invention.

The same part is designated by the same reference numeral wherever it occurs throughout the several views.

In the drawing 10 designates a hub which may be of any standard type of make and having the usual flange 11. 12 designates the driving flange member of the hub structure and is provided with the usual driving flange 13 adapted to be detachably bolted or otherwise secured to the hub flange 11. 14 is a sleeve member designed to fit over the hub 10 and having a radial flange portion 15 adapted to be bolted or otherwise secured to the hub flange 11. In practice the same bolts employed to secure the driving flange member 12 to the hub flange 11 are also employed to secure the flange 15 of sleeve 14 to the hub flange 11. In Fig. 5, I have shown a form of securing bolt which I have found efficient for this purpose and which comprises the bolt 16 formed intermediate its ends with an annular shoulder 17 and a cone-shaped portion 18. The ends of the bolt 16 which extend beyond or to opposite sides of the shoulder 17 are threaded. In assembling the structure bolt holes are formed through the flanges 11, 13 and 15. The threaded end portion of bolt 16 at one side of the shoulder 17 extends through flanges 11 and 15, and a nut 19 serves to clamp the two flanges 11, 15, together. In practice the beveled portion 18 of the shoulder of the bolt is received within a seat or depression surrounding the bolt hole through flange 11, as shown in Fig. 1. If desired, however, the hole through flange 11 may be tapered to conform to the taper 18 of the shoulder 17, as shown in Fig. 3. The shoulder 17 of the stud bolt bears against the outer face of the flange 11 when the nut 19 is secured up tight against the inner face of the flange 15. The shoulder 17 of the stud bolt is received within the bolt hole or opening in flange 13, as clearly shown in Figs. 1 and 3, and the driving flange 13 of the hub cap member 12 is securely clamped against the outer face of the hub flange 11 by means of the nut 20.

From the foregoing description it will be seen that I provide an exceedingly simple hub structure in which the driving hub cap member 12 may be easily and readily detached, removed or replaced without disturbing the other parts of the hub structure by simply removing the clamp nut 20.

In accordance with the principles of my invention I propose to support a demountable metal disk wheel upon and secure the same to the annular flange member 15 and independently of the connecting means which secure together said flange 15 and the hub flange 11 and driving flange 13 of the hub cap. This result is accomplished in one form of embodiment as illustrated, for example, in Figs. 1 and 3, by forming the flange 15 with an inclined shoulder 21 upon its outer face, and I form the metal wheel disk 22 with a central opening having a correspondingly inclined or beveled surface, as indicated at 22, designed to be received and rest upon the shoulder 21 of the flange 15. This supporting shoulder 21 is formed of the flange 15 at a point beyond the peripheral edges of the flanges 11 and 13. The metal disk wheel may be clamped and secured to the flange 15 in any suitable or convenient manner, radially beyond the shoulder 21, that is, at a greater radial distance from the wheel or hub axis than the shoulder 21. A simple and efficient means which permit of the ready application to a detachment of the wheel 22 to flange 15 is shown, consisting of a bolt structure 23 (see Fig. 4) having an annular shoulder 24 with a reduced part 25 intermediate its ends, said bolt being threaded at its opposite ends. The reduced threaded end of the bolt 23 is designed to extend through a bolt opening in the flange 15 and to receive at the inner face of said flange a clamp nut 26. The outer face of the flange 15 is formed with recesses or seats to receive the shoulders 24, 25. By clamping up of the nut 26 the bolt 23 is securely clamped and held in the flange 15. The wheel 22 is formed with a bolt opening to permit the wheel to slip on the other threaded end of the bolt 23 so as to bear against the exterior surface of the flange 15 and the bolt shoulder 24. A clamp nut 27 threaded upon the projecting end of the bolt 23 serves to clamp the disk firmly and rigidly to the flange 15. If desired, and as shown, a washer 28 may be interposed between the cap nut 27 and the wheel 26. Also, if desired, and as shown, the wheel may be formed with depressions in its exterior face to receive the washer 28, but these are structural details to which my invention in its broadest scope is not limited or restricted.

From the foregoing description it will be seen that I provide an exceedingly simple structure by means of which a sheet metal disk wheel may be applied to and demounted from the flange 15 without disturbing in any way the hub structure, and likewise, the wheel axle may be detached and removed without disturbing the mounting of the wheel. It will also be observed that the metal disk portion of the wheel structure is received and supported wholly upon the flange member 15, the inclined annular shoulder 21 of said flange forming the bearing seat for the disk.

If desired, and as shown, the wheel disk 22 may be formed with an annular channel, or such a channel may be pressed into the wheel, as indicated at 29, adjacent its central bore to strengthen the structure at this point.

In the case of a rear or drivnig wheel, the sleeve portion 14 with its annular flange 15, may constitute parts of a brake drum 30. In the case of a front wheel, a sleeve member 31 with an annular flange portion 32, is clamped to the flange 11 of the hub 10 in suitable manner through the bolt holes indicated at 33, said annular flange 32 being formed with the inclined shoulder 33 to form a bearing support for the disk, the latter being formed with a bolt opening 34 for that purpose.

In place of using a hub sleeve having a driving flange, the hub sleeve 10, in certain cases, and in certain types of axle arrangement, may be received upon a square or polygonally shaped axle end.

Where the sleeve member 14 and flange 15 form parts of a brake drum 30, it is, of course, desirable that the brake shoe receiving part of the drum be maintained in proper line and relation with respect to the brake shoes and their operating connections. At the same time and without lateral displacement of the drum itself the radial flange portion 15 thereof must reach outwardly a sufficient distance to be received flatwise against the hub flange 11, otherwise it would be necessary to interpose filler pieces between the flanges 15 and 11. The structure shown and described permits the elimination of filler blocks by reason of the fact that the flange portion 15 of the drum is pressed or deflected laterally out from the drum proper so as to fit into and occupy the space on the hub sleeve from the inner end of said sleeve to the hub flange.

In Fig. 7 I have shown a slightly modified arrangement wherein the flange portion 35 of the brake drum 36 is formed with a shoulder 37 upon which is received an annular border flange 38 formed at the edge of the central bore or opening of the wheel disk 22, the flanges 11 and 35 being secured together by bolts through the bolt holes indicated at 39, and the wheel disk 22 and flange 35 being secured together by bolts passing through the bolt holes 40.

Having now set forth the objects and nature of my invention and constructions embodying the principles thereof, I desire it to be understood that my invention is not to be limited or restricted to the exact details of structure shown and described; but what I claim as new and useful and of my own invention and desire to secure by Letters Patent, is:—

1. In a metal wheel structure, a hub having an annular flange, a sleeve member applied to the hub and also provided with an annular flange, a hub cap having a driving flange, means to clamp said flanges together in combination with a metal disk wheel member, and means for supporting same upon and clamping it to the annular flange of said sleeve member.

2. In a metal wheel structure, a hub having an annular flange, a sleeve member applied to the hub and also provided with an annular flange, a hub cap having a driving flange, means to clamp said flanges together in combination with a metal disk wheel member, the annular flange of said sleeve member having a shoulder radially exterior to the hub and driving flanges, said shoulder forming a support for said wheel disk member.

3. In a metal wheel structure, a hub having an annular flange, a sleeve member applied to the hub and also provided with an annular flange, a hub cap provided with a flange, means to clamp said flanges together in combination with a metal disk wheel member, the annular flange of said sleeve member having a shoulder radially exterior to the hub and driving flanges, said shoulder forming a support for said wheel disk member, said wheel disk member having an annular depression radially exterior to its point of support upon said shoulder.

4. In a metal wheel structure, a hub having an annular flange, a sleeve member applied to the hub and also provided with an annular flange, a hub cap provided with a flange, means to clamp said flanges together in combination with a metal disk wheel member, having a central bore or opening formed with an inclined wall, the annular flange of said sleeve member having an inclined shoulder upon which the inclined wall of the bore of the disk wheel rests, and is supported, and means for detachably clamping the disk wheel member to said shoulder flange at the point radially exterior to said point of support.

5. In a metal wheel structure, a hub having an annular flange, a sleeve member applied to the hub and also provided with an annular flange, a hub cap having a driving flange, means to clamp said flanges together in combination with a metal disk wheel member, means to form a bearing support for said disk wheel member upon the annular flange of said sleeve member at a point radially exterior to the hub flange, and means to detachably clamp said disk wheel member against said sleeve flange at a point radially exterior to said point of support.

6. In a metal wheel structure, a hub having an annular flange, a sleeve member applied to the hub and also provided with an annular flange, a hub cap having a driving flange, means to clamp said flanges together in combination with a metal disk wheel member, and means for detachably clamping said wheel disk member to the annular flange of said sleeve member.

7. In a metal wheel structure, a hub having an annular flange, a sleeve member applied to the hub and also provided with an annular flange, a hub cap having a driving flange, means to clamp said flanges together in combination with a metal disk wheel member, a bolt, means for mounting said bolt in the annular flange of said sleeve member, said wheel disk member having a bolt opening for said bolt to extend therethrough, and means detachably engaging the extending end of said bolt to detachably clamp said wheel disk member in place.

8. In a metal wheel structure, a hub having an annular flange, a sleeve member applied to the hub and also provided with an annular flange, a hub cap having a driving flange, means to clamp said flanges together in combination with a metal disk wheel member having a seat or depression formed therein, a bolt mounted in the annular flange of said sleeve member, said bolt extending through an opening formed in said seat or depression, a washer fitting upon said bolt end, a seat in said depression, and a clamp nut applied to said bolt nut for clamping said washer against the wheel disk.

9. In a metal wheel structure, a hub having an annular flange, a sleeve member fitting on said hub and also provided with an annular flange, means to detachably clamp said flanges together, a metal disk wheel, and means to detachably clamp said wheel to the annular flange of said sleeve member on the outer side thereof whereby said wheel may be removed without removing said flange.

10. In a metal wheel structure, a hub, a sleeve member applied to said hub and provided with an annular flange, said flange having a seat formed thereon, a metal disk wheel body carried on said seat, and means to detachably secure said wheel body to the flange outside of said seat whereby the wheel body may be removed without removing the flange.

11. In a metal wheel structure, a hub having a flange, a brake drum associated with said hub and secured to said flange, said brake drum being provided with an annular seat and a hub sleeve, a metal disk wheel body supported upon said seat, and means to detachably clamp said wheel body and brake drum together whereby the wheel body may be removed without disturbing the wheel assembly.

12. In a metal wheel structure, a hub, a sleeve member mounted on said hub and provided with an annular flange, a metal disk wheel member supported upon said flange, said wheel member having a seat or depression formed in the face thereof, and means to detachably clamp said wheel member and flange together, including a bolt, said bolt passing through openings in said seat and flange.

13. In a metal wheel structure, a hub having a radial flange, a brake drum having a sleeve portion to fit upon said hub, and a laterally displaced radial flange portion to fit against and to be detachably secured to the hub flange, without disturbing the alignment of the drum, a metal disk wheel member supported upon said laterally displaced drum flange, and means to detachably clamp said wheel member to said drum flange.

14. In a disk wheel the combination with a hub barrel having an annular flange, of a brake drum having a flange bearing on said hub barrel, means for securing together the brake drum and hub flange, and a wheel disk demountably secured to said brake drum by lock bolts whereby the disk is demountable without removing the hub or the brake drum.

15. In a disk wheel, a hub having a flange and a peripheral bearing surface, a disk carrier member having a flange portion and a sleeve member part, said sleeve member part fitting on said bearing surface, a wheel disk seated on said flange portion, means for demountably uniting said flange portion and wheel disk, and means for securing the hub flange and the flange portion together independently of the demountably uniting means.

In testimony whereof I have hereunto set my hand on this 31st day of March A. D., 1922.

WILLIAM BARBER.